US009959243B2

(12) United States Patent
Kim (10) Patent No.: US 9,959,243 B2
(45) Date of Patent: May 1, 2018

(54) APPARATUS AND CIRCUIT FOR PROCESSING DATA

(71) Applicant: Samsung Electronics Co. Ltd., Suwon-si, Gyeonggi-do (KR)

(72) Inventor: Hye-Jeong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 318 days.

(21) Appl. No.: 13/804,634

(22) Filed: Mar. 14, 2013

(65) Prior Publication Data
US 2014/0165078 A1    Jun. 12, 2014

(30) Foreign Application Priority Data
Dec. 7, 2012    (KR) .................. 10-2012-0142106

(51) Int. Cl.
*G06F 15/167*     (2006.01)
*H04M 1/725*      (2006.01)
(52) U.S. Cl.
CPC ...... *G06F 15/167* (2013.01); *H04M 1/72522* (2013.01)
(58) Field of Classification Search
None
See application file for complete search history.

(56) References Cited

U.S. PATENT DOCUMENTS

| 6,987,961 | B1 * | 1/2006 | Pothana ................. 455/412.1 |
| 2005/0066067 | A1 | 3/2005 | Suh |
| 2008/0189500 | A1 | 8/2008 | Jennings et al. |
| 2008/0256305 | A1 | 10/2008 | Kwon et al. |
| 2008/0263286 | A1 | 10/2008 | Jeong et al. |
| 2008/0320243 | A1 | 12/2008 | Mitsuzuka et al. |
| 2010/0095072 | A1 * | 4/2010 | Ido ........................ 711/153 |
| 2010/0227654 | A1 * | 9/2010 | Katou ..................... 455/574 |
| 2011/0249560 | A1 * | 10/2011 | Nakagawa et al. ......... 370/241 |
| 2012/0047390 | A1 * | 2/2012 | Hildebrand .............. 713/501 |
| 2012/0089814 | A1 | 4/2012 | Gupta et al. |
| 2012/0106570 | A1 | 5/2012 | Li |
| 2012/0183029 | A1 | 7/2012 | Vaglica et al. |
| 2012/0303723 | A1 * | 11/2012 | Fang ..................... 709/206 |
| 2012/0331190 | A1 | 12/2012 | Nakagawa et al. |
| 2013/0268689 | A1 * | 10/2013 | Leucht-Roth ............ 709/232 |

FOREIGN PATENT DOCUMENTS

| CN | 101286144 A | 10/2008 |
| CN | 101495980 A | 7/2009 |
| KR | 10-2012-0072292 A | 7/2012 |

\* cited by examiner

*Primary Examiner* — Charles E Anya
(74) *Attorney, Agent, or Firm* — Jefferson IP Law, LLP (57) ABSTRACT

A circuit for processing data is provided. The circuit includes an Application Processor (AP), a Communication Processor (CP), and a storage unit including at least a first region which the AP and the CP access and from/to which data related to at least one of the AP and the CP is read/written, and a second region which the CP accesses and from/to which data related to the CP is read/written.

28 Claims, 5 Drawing Sheets

APPARATUS AND CIRCUIT FOR PROCESSING DATA

PRIORITY

This application claims the benefit under 35 U.S.C. § 119(a) of a Korean patent application filed on Dec. 7, 2012 in the Korean Intellectual Property Office and assigned Serial No. 10-2012-0142106, the entire disclosure of which is hereby incorporated by reference.

BACKGROUND OF THE INVENTION

1. Field of the Invention

The present invention relates to an apparatus and method for processing data. More particularly, the present invention relates to an apparatus and method for processing data among processors sharing a storage unit.

2. Description of the Related Art

A communication device according to the related art performs various functions. A function may be characterized as performing at least one of two functions—a function performing a User Interface (UI) and executing an application, and a communication function. For convenience, the function performing the UI and executing the application is referred to as a 'non-communication function'.

According to the related art, a communication device may process the non-communication function and the communication function using one processor. However, as a need for a faster communication speed increases and as complexity of applications increases, a communication device may perform the non-communication function and the communication function using a plurality of processors. For example, when a communication device according to the related art is a smart phone, the communication device performs a non-communication function using an Application Processor (AP) and performs a communication function using a Communication Processor (CP). The AP and the CP may be implemented as separate chips, or one chip.

According to the related art, data may be communicated (e.g., via transmission/reception) between the AP and the CP in order to transmit/receive data and process data using a communication network. For example, if a Long-Term Evolution (LTE) terminal performs a File Transfer Protocol (FTP) download operation, data received through a CP is transferred to an AP, and thereafter the AP performs a data processing operation such as data storage. In contrast, if the LTE terminal performs an upload operation, the AP transfers data to be uploaded to the CP, and thereafter the CP transmits the data to be uploaded through a communication network. In a video streaming context such as the streaming of video from an internet service such as, for example, YouTube®, the CP transfers received data to the AP, the AP processes the data transferred from the CP and displays the processed data on a screen.

As described above, in a communication device according to the related art, data transmission/reception between an AP and a CP frequently occurs. As such, the communication device according to the related art uses a serial interface such as a Universal Serial Bus (USB), a High Speed Integrated Circuit (HSIC), and a Secure Digital Input Output (SDIO), a shared memory such as a Dual Port Random Access Memory (DPRAM) and the like. Specially, if the AP and the CP are implemented as one chip, the AP and CP share a bus, and consequently, a communication device according to the related art uses a scheme for transmitting/receiving data using a shared memory included in the chip.

Figure 1:
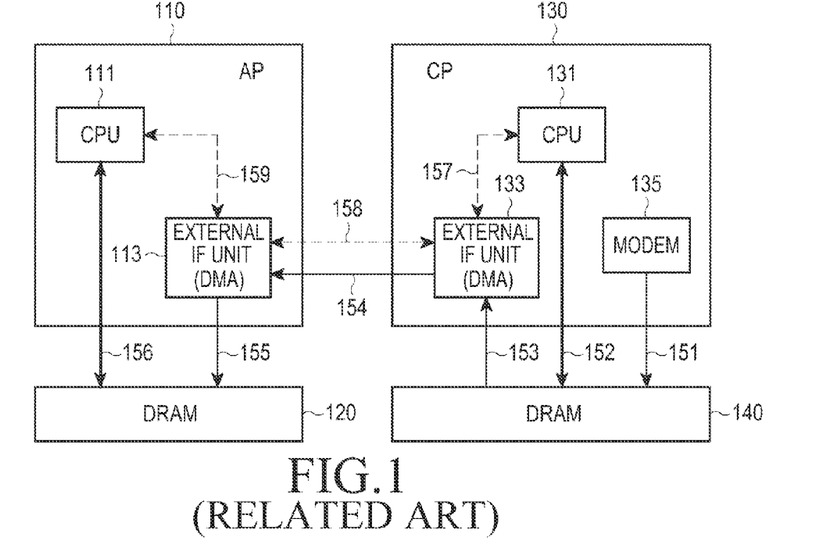
FIG. 1 schematically illustrates a process in which each of an Application Processor (AP) and a Communication Processor (CP) uses a Dynamic Random Access Memory (DRAM) and processes data through an InterFace (IF) unit in a communication device according to the related art.

FIG. 1 schematically illustrates a process in which each of an AP and a CP uses a DRAM and processes data through an external InterFace (IF) unit in a communication device according to the related art.

Referring to FIG. 1, the communication device includes an AP 110, a Dynamic Random Access Memory (DRAM) 120 (e.g., such as a Low Power Double Data Rate (LPDDR2)), a CP 130, and a DRAM 140 (e.g., such as an LPDDR2). The AP 110 includes a Central Processing Unit (CPU) 111 and an IF unit 113, and the CP 130 includes a CPU 131, an IF unit 133, and a MOdulator/DE-Modulator (MODEM) 135.

The MODEM 135 writes data corresponding to decoded data stored in a decoder buffer to the LPDDR2 140 in step 151. The CPU 131 reads/writes data necessary for performing a communication function from/to the DRAM 140 in step 152. The CPU 131 configures Internet Protocol (IP) packet data using a communication standard protocol such as, for example, an L1/L2/L3, a Network Application Support (NAS), and the like. In step 153 and 154, the data stored in the DRAM 140 (e.g., the IP packet data) is transferred between the IF units 133 and 113 to the AP 110. In the AP, the IP packet data is written to the DRAM 120 in step 155.

When writing the data stored in the DRAM 140 to the DRAM 120 through the IF units 133 and 113, a process for transmitting/receiving a control message among the CPU 131, the IF units 133 and 113, and the CPU 111 is necessary in steps 157, 158, and 159.

The CPU 111 reads/writes data necessary for performing an application function from/to the DRAM 120 in step 156.

According to the related art, each of the IF units 133 and 113 may include a Direct Memory Access (DMA) unit. Conversely, each of the IF units 133 and 113 may use an external general DMA. A CPU or a separate processor may read/write data. The data processing process as described in FIG. 1 is for a DownLink (DL) communication. However, one ordinary skill in the art would understand that the data processing process may be performed in reverse for an UpLink (UL) communication.

Figure 2:
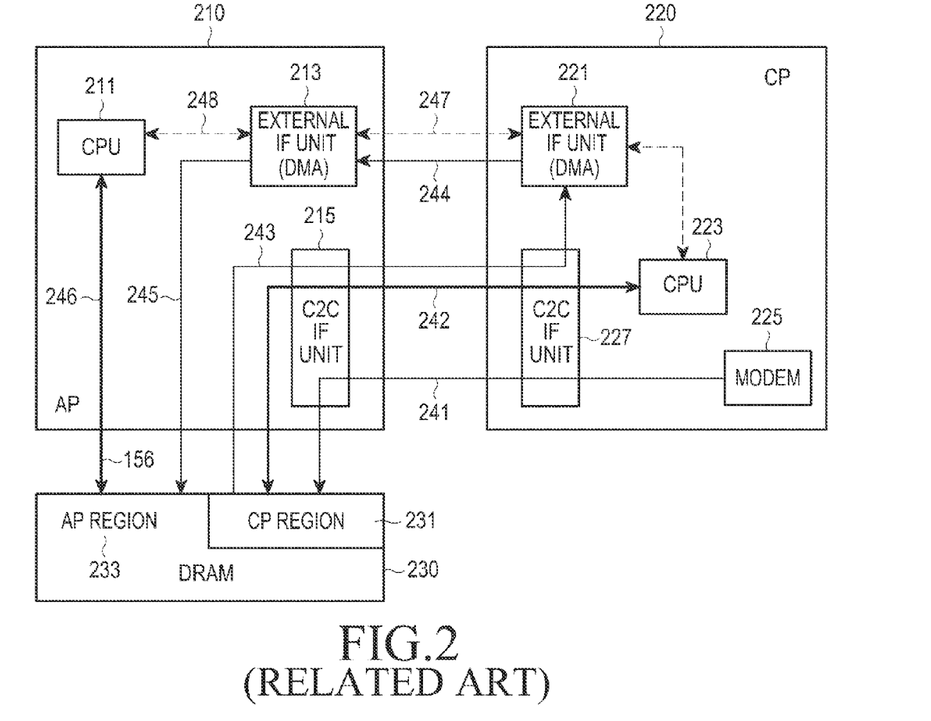
FIG. 2 schematically illustrates a process in which an AP and a CP share a DRAM using a Chip to Chip (C2C) scheme and process data in a communication device according to the related art.

FIG. 2 schematically illustrates a process in which an AP and a CP share a DRAM using a Chip to Chip (C2C) scheme and process data in a communication device according to the related art.

Referring to FIG. 2, the communication device includes an AP 210, a CP 220, and a DRAM 230 (e.g., an LPDDR2). The AP 210 includes a CPU 211, an IF unit 213, and a C2C IF unit 215, and the CP 220 includes an IF unit 221, a CPU 223, a MODEM 225, and a C2C IF unit 227. The DRAM 230 includes a CP region 231 in which data related to the CP 220 is stored, and an AP region 233 in which data related to the AP 210 is stored.

The MODEM 225 writes data corresponding to decoded data stored in a decoder buffer to the CP region 231 in step 241. The CPU 223 reads/writes data necessary for performing a communication function from/to the CP region 231 in step 242. The CPU 223 configures IP packet data using a communication standard protocol such as an L1/L2/L3, a NAS, and the like. The data stored in the CP region 231 (e.g., the IP packet data) is written to the AP region 233 through the external IF units 221 and 213 in steps 243, 244, and 245.

When writing the data stored in the CP region 231 to the AP region 223 through the IF units 221 and 213, a process for transmitting/receiving a control message among the CPU 223, the IF units 221 and 213, and the CPU 211 is necessary in step 247, and 248.

The CPU 211 reads/writes data necessary for performing an application function from/to the AP region 223 in step 246.

According to the related art, each of the IF units 221 and 213 may include a DMA unit. Conversely, each of the IF units 221 and 213 may use an external general DMA, or a separate processor may read/write data. The data transmitting/receiving process as described in FIG. 2 is for a DL communication. However, one of ordinary skill in the art would understand that the data processing process may be performed in reverse for a UL communication.

In the communication device as described in FIGS. 1 and 2, the data transmitting/receiving process may result in a limitation for a possible data throughput based on a Band Width (BW) for a C2C scheme because the number of DRAM read/write operations is large in the data transmitting/receiving process. For example, in an LTE Category-3 DL, even though a CP uses a scheme optimized with a zero copy scheme, the CP may write decoded data to a DRAM, read the data written to the DRAM from the DRAM for deciphering, write the deciphered data to the DRAM, and perform a read operation for transferring user data processed with a protocol to an AP. The CP may read/write 100 Mbps data from/to the DRAM at least four times.

If a CP does not use a zero copy scheme, a data copy operation is necessary in order to generate segmented data as an IP packet. Consequently, the number of data read/write operations on a DRAM increases (e.g., a data read/write operation for a data ciphering/deciphering is not shown in FIGS. 1 and 2).

If DL/UL data is simultaneously transmitted/received, a total of four data read/write operations is necessary in a UL as well as a DL. Accordingly, a total of eight data read/write operations is necessary for the DL and the UL.

If a data throughput increases, a congestion situation occurs on a Dynamic Memory Controller (DMC) for a DRAM access in the data processing process in FIG. 1. Such congestion on the DMC may result in a bottleneck situation on an access to a DRAM and a decrease of a processing speed for an external IF.

If a data throughput increases, a congestion situation occurs on a C2C in the data processing process in FIG. 2. Such congestion on the C2C may result in a limitation for a high-speed data processing and a decrease of a processing speed for an external IF.

According to the related art, a data transmission speed between an AP and a CP may be faster than a maximum data transmission speed of the CP. For example, in a DL, when a packet error occurs, data transmission may not be possible until a related packet is received, and relatively more data is transferred to an AP all at once according to a retransmission completion for the related packet. In a UL, more data than data corresponding to a maximum speed which a CP supports may be transferred from an AP to a CP according to an operation of an application which the AP processes. In such cases, a CP may not operate normally due to a momentary increase for a data transmission speed through an IF.

Therefore, a need exists for an apparatus and method for processing data between processors sharing a storage unit.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention proposes an apparatus and circuit for processing data.

Another aspect of the present invention is to provide an apparatus and circuit for processing data between processors sharing a storage unit.

Another aspect of the present invention is to provide an apparatus and circuit for processing data thereby minimizing the number of data read/write operations.

Another aspect of the present invention is to provide an apparatus and circuit for processing data thereby removing data transmission/reception through an external IF unit.

In accordance with an aspect of the present invention, a circuit for processing data is provided. The circuit includes an Application Processor (AP), a Communication Processor (CP), and a storage unit including at least a first region which the AP and the CP access and from/to which data related to at least one of the AP and the CP is read/written, and a second region which the CP accesses and from/to which data related to the CP is read/written.

In accordance with another aspect of the present invention, a circuit for processing data is provided. The circuit includes an Application Processor (AP), a Communication Processor (CP), and a storage unit including a first region which the AP and the CP access and from/to which data related to at least one of the AP and the CP is read/written, a second region which the CP accesses and from/to which data related to the CP is read/written, and a third region which the AP and the CP access and from/to which an Inter Processor Communication (IPC) message used for an IPC between the AP and the CP is read/written.

In accordance with further another aspect of the present invention, an apparatus for processing data is provided. The apparatus includes an Application Processor (AP), a Communication Processor (CP), and a storage unit including a first region which the AP and the CP access and from/to which data related to at least one of the AP and the CP is read/written, and a second region which the CP accesses and from/to which data related to the CP is read/written.

In accordance with still another aspect of the present invention, apparatus for processing data is provided. The apparatus includes an Application Processor (AP), a Communication Processor (CP), and a storage unit including a first region which the AP and the CP access and from/to which data related to at least one of the AP and the CP is read/written, a second region which the CP accesses and from/to which data related to the CP is read/written, and a third region which the AP and the CP access and from/to which an Inter Processor Communication (IPC) message used for an IPC between the AP and the CP is read/written.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces, An exemplary embodiment of the present invention proposes an apparatus and circuit for processing data.

According to exemplary embodiment of the present invention, an apparatus may process data between processors sharing a storage unit.

According to an exemplary embodiment of the present invention, an apparatus may process data using a process or configuration that reduces or minimizes the number of data read/write operations.

According to an exemplary embodiment of the present invention, an apparatus may process data using a process or configuration that recues or eliminates the need for data transmission/reception through an external InterFace (IF) unit.

For convenience, it will be assumed that the processors include an Application Processor (AP) and a Communication Processor (CP). One of ordinary skill in the art would understand that an apparatus and circuit for processing data, proposed in exemplary embodiments of the present invention, may be applied to other processors as well as the AP and the CP.

Further, it will be assumed that the storage unit is a Dynamic Random Access Memory (DRAM). One of ordinary skill in the art would understand that an apparatus and circuit for processing data, proposed in exemplary embodiments of the present invention, may be applied to other storage units as well as the DRAM.

Figure 3:
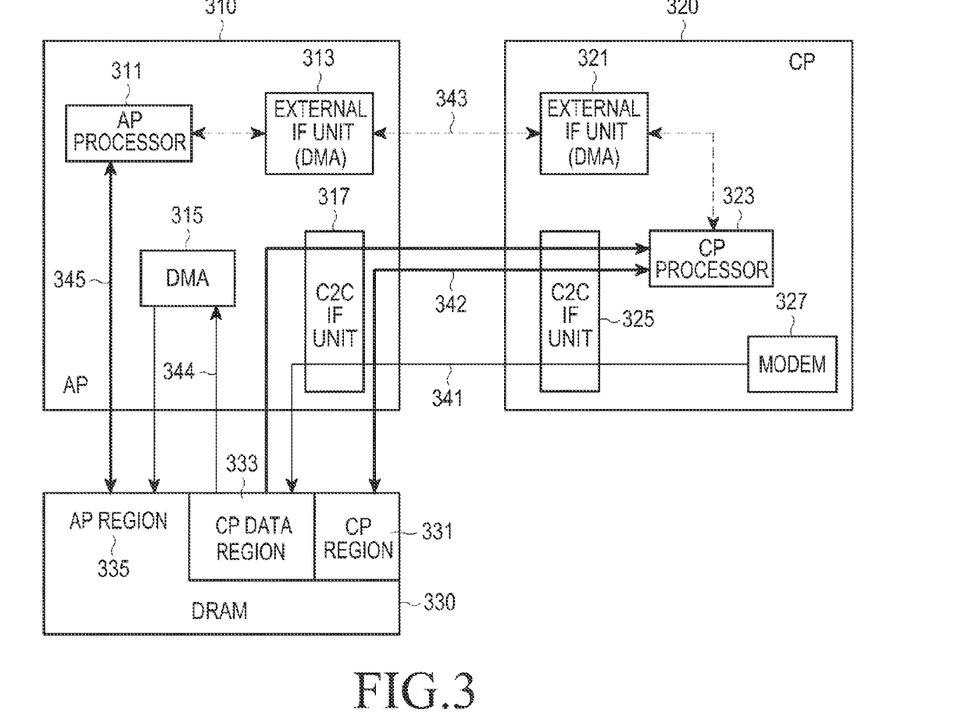
FIG. 3 schematically illustrates a process in which an AP and a CP process data upon sharing a DRAM and using an IF unit in a communication device according to an exemplary embodiment of the present invention.

FIG. 3 schematically illustrates a process in which an AP and a CP process data upon sharing a DRAM and using an IF unit in a communication device according to an exemplary embodiment of the present invention.

Referring to FIG. 3, the communication device includes an AP 310, a CP 320, and a DRAM 330. The AP 310 includes an AP processor 311, an external IF unit 313, a Direct Memory Access (DMA) unit 315, and a Chip to Chip (C2C) IF unit 317. The CP 320 includes an external IF unit 321, a CP processor 323, a C2C IF unit 325, and a MOdulator/DE-Modulator (MODEM) 327. According to an exemplary embodiment of the present invention, the CP 320 uses a cellular MODEM protocol as a communication protocol. However, one of ordinary skill in the art would understand that the CP may use various communication protocols such as a Wi-Fi, a Near Field Communication (NFC), and the like.

The DRAM 330 includes a CP region 331, a CP data region 333, and an AP region 335. The CP region 331 is a region from/to which the CP 320 may read/write data related to an operation of the CP 320. The CP data region 333 is a region which the AP 310 may access and from/to which data transmitted to an external communication network through the CP 320 or received from the external communication network through the CP 320 may be read/written, and the AP region 335 is a region from/to which data related to an operation of the AP 310 may be read/written. The data related to the operation of the AP 310 includes data processed by the CP 320 or data to be transmitted by the CP 320. For example, the CP data region 333 may be a region which the CP 320 operatively controls and which the AP 310 and the CP 320 may access. In other words, the CP data region 333 is a common region which the AP 310 and the CP 320 may share and from/to which the AP 310 and the CP 320 may read/write data. For example, the AP 310 may read/write data from/to the CP data region 333 by receiving necessary information from the CP 320.

Data received in the MODEM 327 is written in the CP data region 333 included in the DRAM 330 in step 341. The data may correspond to data which the MODEM 327 has received through the C2C IF units 325 and 317 in step 341. For example, the MODEM 327 writes data identical to decoded data stored in a decoder buffer in the CP data region 333 in step 341. The CP processor 323 generates an Internet Protocol (IP) packet by performing a protocol stack operation such as a deciphering, a reordering and an Automatic Retransmission request (ARQ) in step 342. The CP processor 621 reads/writes data necessary for performing by the CP processor 323 a communication function through the C2C IF units 341 and 317 from/to the CP region 331 and the CP data region 333 in step 342. The CP processor 323 operatively controls the data read/write operation. However, one of ordinary skill in the art would understand that a DMA, a separate processor, or a separate HardWare (HW) as well as the CP processor 323 may also control the data read/write operation.

The CP processor 323 transfers information on the generated IP packet to the AP 310. The IP packet may be scattered in the DRAM 330. In this case, scatter data information such as a linked list is transferred in step 343. The CP processor 323 may transmit/receive control messages to/from the AP processor 311 through the external IF units 321, and 313 in step 343.

The AP processor 311 reads the generated IP packet from the CP data region 333, writes the IP packet to the AP region 335 (e.g., copies the generated IP packet from the CP data region 333) and notifies the CP processor 323 of data copy completion in step 344. For example, the AP processor 311 may write the generated IP packet to the AP region 335 by reading the generated IP packet from the CP data region 333 without using the external IF units 321 and 313.

The AP processor 311 performs an AP processing operation such as data display, memory storage, and the like in step 345. For example, the AP processor 311 reads/writes data necessary for performing an application function from/to the AP region 335 in step 345.

The CP data region 333 may be a region which the CP 320 operatively manages, and may be a region in which first data has been stored and may be reused as a region in which new data is stored. The first data may correspond to data which is transferred to the AP 310 after completion of a CP processing operation for received data. For example, the CP data region 333 may be implemented as a circular buffer, and the CP 320 may divide the circular buffer into regions with a preset size, and may control the CP data region 333 using a tag indicating availability for each of the divided regions.

If the CP 320 does not receive information indicating data copy completion from the AP 310 for a preset time interval, the CP 320 determines whether data copy is completed with the AP 310.

As an example, a data processing process as described in FIG. 3 corresponds to a process for a DownLink (DL). However, one of ordinary skill in the art would understand that the data processing process may be performed in reverse for an UpLink (UL).

The CP data region 333 may be implemented for separately storing DL data and UL data, and will be described with reference to FIG. 4.

Figure 4:
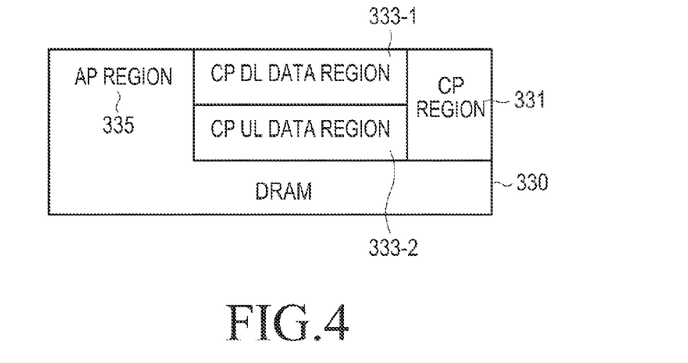
FIG. 4 schematically illustrates a configuration of a DRAM shared between an AP and a CP according to an exemplary embodiment of the present invention such as, for example, the DRAM illustrated in FIG. 3.

FIG. 4 schematically illustrates a configuration of a DRAM shared between an AP and a CP according to an exemplary embodiment of the present invention such as, for example, the DRAM illustrated in FIG. 3.

Referring to FIG. 4, the DRAM 330 includes a CP region 331, a CP data region 333, and an AP region 335. The CP data region 333 includes a CP DL data region 331-1 and a CP UL data region 331-2.

For a UL, the CP 320 notifies the AP 310 of information on a usable region, the AP 310 writes data to be transmitted to the CP UL data region 331-2, and transfers information related to a location and a size of the written data to the CP 320. Upon receiving the information related to the location and the size, the CP 320 performs a UL data transmitting process after transmitting an ACKnowledgement (ACK) and information on a new storage region.

FIGS. 5A to 5D schematically illustrate a structure of a DRAM which may be implemented in a case in which an AP and a CP in a communication device share a DRAM and process data according to an exemplary embodiment of the present invention.

Figure 5A:
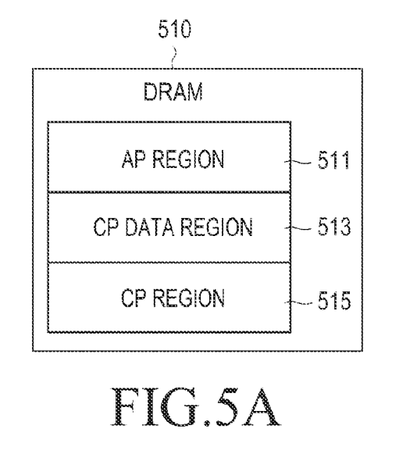
FIGS. 5A to 5D schematically illustrate a structure of a DRAM which may be implemented in a case in which an AP and a CP in a communication device share a DRAM and process data according to an exemplary embodiment of the present invention.

Referring to FIG. 5A, a DRAM 510 includes an AP region 511, a CP data region 513, and a CP region 515. The AP region 511 may be a region which an AP accesses. The CP data region 513 may be a region which a CP operatively accesses and which the AP accesses The CP region 515 may be a region which the CP accesses.

Figure 5B:
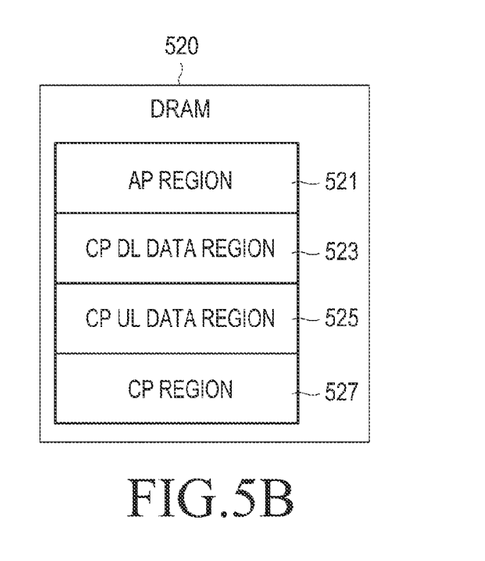

Referring to FIG. 5B, a DRAM 520 includes an AP region 521, a CP DL data region 523, a CP UL data region 525, and a CP region 527. The AP region 521 may be a region which an AP accesses. The CP DL data region 523 and the CP UL data region 525 may be regions which a CP operatively controls and which the AP and the CP access. The CP region 527 may be a region which the CP accesses. The CP DL data region 523 is a region from/to which DL data is read/written, and the CP UL data region 525 is a region from/to which UL data is read/written.

Figure 5C:
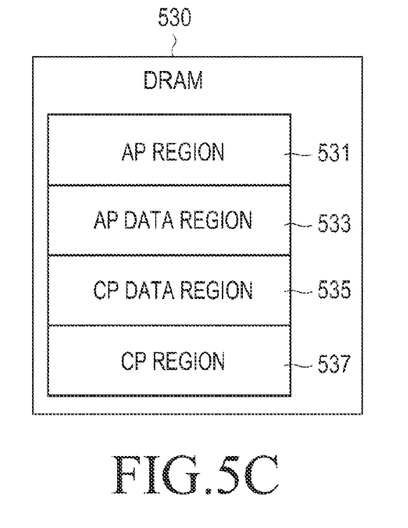

Referring to FIG. 5C, a DRAM 530 includes an AP region 531, an AP data region 533, a CP data region 535, and a CP region 537. The AP region 531 may be a region which an AP accesses. The AP data region 533 may be a region which the AP operatively controls and which the AP and a CP access. The CP data region 535 may be a region which the CP operatively controls and which the AP and CP access. The CP region 537 may be a region which the CP accesses. The AP data region 533 is similar in operation to the CP UL data region 525 illustrated in FIG. 5B, and the CP data region 535 is similar in operation to the CP DL data region 523. For example, the difference between the DRAM in FIG. 5B and the DRAM in FIG. 5C corresponds to which processor controls each of the regions respectively included in each of the DRAMs 520 and 530. In FIG. 5B, all of DL/UL data regions are controlled by a CP processor. In contrast, in FIG. 5C, an AP data region is controlled by an AP processor, and a CP data region is controlled by a CP processor.

Figure 5D:
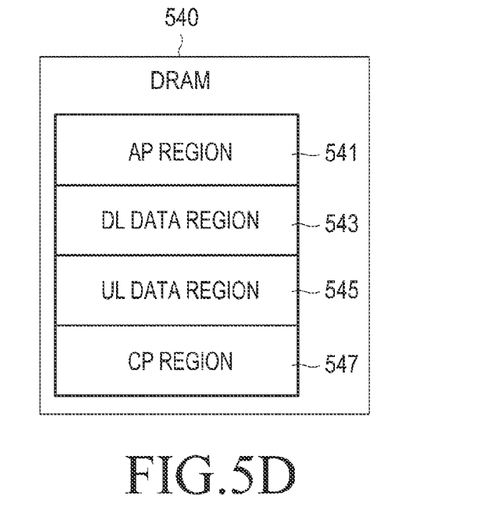

Referring to FIG. 5D, a DRAM 540 includes an AP region 541, a DL data region 543, a UL data region 545, and a CP region 547. The AP region 541 may be a region which an AP accesses. The DL data region 543 and the UL data region 545 may be regions which the AP accesses and a CP accesses. The CP region 547 may be a region which the CP accesses. The DL data region 543 is a region from/to which DL data is read/written, and the UL data region 545 is a region from/to which UL data is read/written. In this case, the DL data may be used by copying the DL data from a DL data region to an AP region, and the UL data may be used by copying the UL data from a UL data region to a CP region. However, without copying the DL data, a CP may configure the DL data to an IP packet by performing a protocol processing operation in a DL data region, and an AP may perform an application using the IP packet in the same DL data region.

In the same manner, the AP configures the UL data to an IP packet in a UL data region, and the CP may transmit the IP packet to an external communication network by performing the protocol processing operation in the same UL data region. In this case, a process for copying data from a DL data region or a UL data region to an AP region or a CP region becomes unnecessary, so a data processing speed and a data throughput may increase.

In the structure of the DRAM described in FIGS. 5A to 5D, if a data copy among each region included in a related DRAM occurs, the number of DRAM read/write operations has not decreased. However, because a C2C IF unit and external IF units are not used for a data transmission/ reception between a CP and an AP, a data transmission/reception performance decrease due to a BandWidth (BW) limitation and/or a performance decrease for the C2C IF unit and the external IF unit may be prevented.

Figure 6:
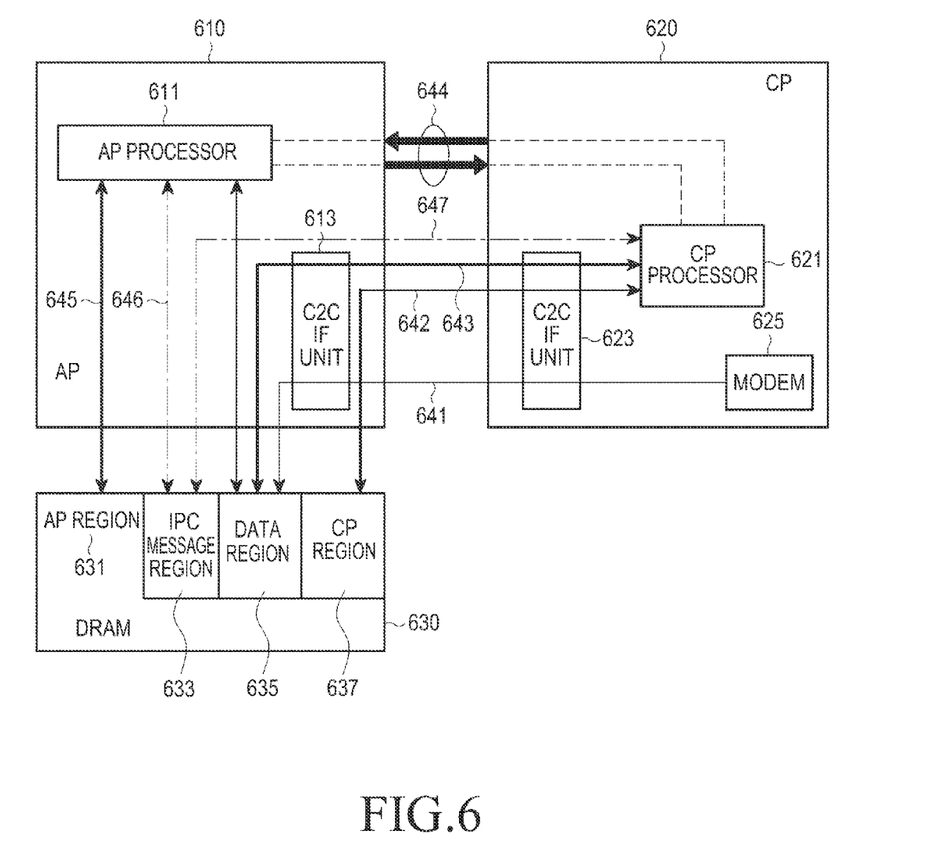
FIG. 6 schematically illustrates a process in which an AP and a CP process data upon sharing a DRAM without using an IF unit in a communication device according to an exemplary embodiment of the present invention.

FIG. 6 schematically illustrates a process in which an AP and a CP process data upon sharing a DRAM without using an IF unit in a communication device according to an exemplary embodiment of the present invention.

Referring to FIG. 6, the communication device includes an AP 610, a CP 620, and a DRAM 630. The AP 610 includes an AP processor 611 and a C2C IF unit 613, and the CP 620 includes a CP processor 621, a C2C IF unit 623, and a MODEM 625.

The DRAM 630 includes an AP region 631, an Inter Processor Communication (IPC) message region 633, a data region 635, and a CP region 637.

The AP region 631 may be a region which the AP 610 accesses, the IPC message region 633 may be a region from/to which a control message or an IPC message is read/written, and used for transmitting/receiving data association information to/from a shared region of the DRAM 630 (e.g., the data region 635). The IPC message region 633 is separately managed, so a HardWare (HW) Interrupt is transmitted/received between the AP 610 and the CP 620 in order to indicate that data to be transmitted is stored in the IPC message region 633. The data region 635 may be a region which the AP processor 611 and the CP processor 613 access, and may be implemented as described in FIGS. 5A to 5D. The CP region 637 may be a region which the CP processor 613 accesses.

Data received in the MODEM 625 is written to the data region 635 in step 631. The data received in the MODEM 625 is data which the MODEM 625 has received through the C2C IF units 623, and 613 in step 641. For example, the MODEM 625 writes data identical to decoded data stored in a decoder buffer to the data region 635 in step 641.

The CP processor 621 generates an IP packet by performing a protocol stack operation such as a deciphering, a reordering and an ARQ in steps 642, and 643. The CP processor 621 reads/writes data necessary for performing by the CP processor 621 a communication function through the C2C IF units 623 and 613 from/to the CP region 637 and the data region 635 in steps 642, and 643.

The CP processor 621 transfers information on the generated IP packet to the AP 610. The IP packet may be scattered in the DRAM 630, in this case, scatter data information such as a linked list is transferred in steps 642, and 643. The scatter data information such as the linked list is stored in the IPC message region 633, and the CP processor 621 notifies the AP processor 611 that related information is stored in the IPC message region 633 through a HW Interrupt. For example, in the structure of the communication device as shown in FIG. 6, data association information transmitted through an external IF unit in the structure of the communication device as shown in FIG. 3 is transmitted through an IPC message region of an external DRAM.

The AP processor 611 reads the IP packet information from the IPC message region 633 through the HW Interrupt, reads the generated IP packet from the CP data region 637, writes the generated IP packet to the AP region 631 (e.g., copies the generated IP packet from the CP data region 637), and notifies the CP processor 621 that data copy has completed in step 644. For example, the AP processor 611 may read the generated IP packet from the CP data region 637 and write the generated IP packet to the AP region 631.

The AP processor 611 performs an AP processing operation such as a data display and a memory storage in step 645. For example, the AP processor 611 reads/writes data necessary for performing a communication function from/to the AP region 631 in step 645.

The data region 635 is a region which the AP 610 and the CP 620 manage together, and is a region in which the first data has been stored and which may be reused as a region in which new data is stored. The first data corresponds to data which is transferred to the AP 610 after completion of a CP processing for received data in the CP 620. In contrast, a region in which the second data has been stored may be reused as a region in which new data is stored. The second data corresponds to data which is transferred to the CP 620 after completion of an AP processing for received data in the AP.

For example, the data region 635 may be implemented as a circular buffer, and the CP 620 may divide the circular buffer into regions with a preset size, and control the data region 635 using a tag indicating availability for each of the divided regions. However, one of ordinary skill in the art would understand that the AP 610 may divide the circular buffer into regions with a preset size, and control the data region 635 using a tag indicating availability for each of the divided regions.

The AP processor 611 and the CP processor 621 read/write data which should be transmitted/received between the AP 610 and the CP 620 except for a control message, an IPC message, and an IP packet which have occurred on performing a related operation from/to the IPC message region 633 in steps 646, and 647. For example, a processor for transmitting an arbitrary message or data writes the arbitrary message or the data to the IPC message region 633, and notifies a processor for receiving the arbitrary message or the data that the arbitrary message or the data is stored in the IPC message region 633 through a HW Interrupt. Therefore, the processor for receiving the arbitrary message or the data reads the arbitrary message or the data.

If the CP 320 does not receive information indicating data copy completion from the AP 610 for a preset time interval, the CP 620 determines whether the AP 610 has completed data copy.

For example, a data processing process as described in FIG. 6 is for a DL, however, it will be understood by those of ordinary skill in the art that the data processing process may be performed in reverse for a UL.

The DRAM 630 may be implemented as a structure different from the structure as shown in FIG. 6, such as the structure described with reference to FIG. 7.

Figure 7:
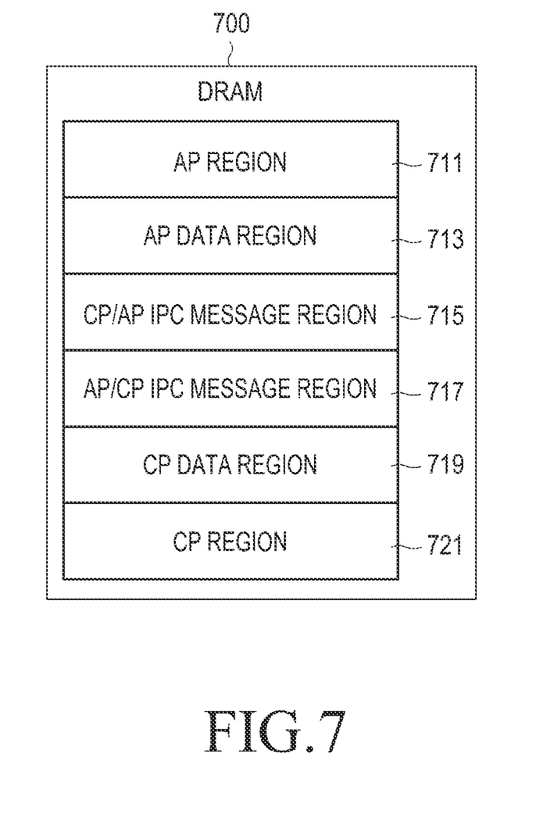
FIG. 7 schematically illustrates a configuration of a DRAM shared between an AP and a CP according to an exemplary embodiment of the present invention such as, for example, the DRAM illustrated in FIG. 6.

FIG. 7 schematically illustrates a configuration of a DRAM shared between an AP and a CP according to an exemplary embodiment of the present invention such as, for example, the DRAM illustrated in FIG. 6.

Referring to FIG. 7, the DRAM 700 includes an AP region 711, an AP data region 713, a CP/AP IPC message region 715, an AP/CP IPC message region 717, a CP data region 719, and a CP region 721.

The AP region 711 is a region which the AP 610 accesses. The AP data region 713 is a region which the AP 610 operatively controls and which the AP and a CP may access. The CP/AP IPC message region 715 is a region from/to which an IPC message transferred from the CP 620 to the AP 610 is read/written. The AP/CP IPC message region 717 is a region from/to which an IPC message transferred from the AP 610 to the CP 620 is read/written. The CP 721 is a region which the CP 620 accesses.

One of ordinary skill in the art would understand that the DRAM 630 in FIG. 6 may implemented as the structures described in FIGS. 5A to 5D as well as the structure described in FIG. 7, and a region is additionally divided corresponding to a CP/AP IPC message region and an AP/CP IPC message region.

As is apparent from the foregoing description, an exemplary embodiment of the present invention enables data processing between processors sharing a storage unit.

An exemplary embodiment of the present invention enables data processing thereby minimizing the number of data read/write operations. An exemplary embodiment of the present invention enables data processing thereby minimizing load for each of processors, and fast transmitting/receiving data among the processors.

An exemplary embodiment of the present invention enables data processing thereby removing data transmission/reception through an external IF unit. Accordingly, an exemplary embodiment of the present invention enables data processing thereby preventing performance decrease for processors due to performance limitation for the external IF unit.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A circuit for processing data, the circuit comprising:
an Application Processor (AP);
a Communication Processor (CP); and
a storage unit comprising:
at least a first region which the CP operatively controls, and the AP
and the CP access and from/to which data of at least one of the AP and the CP is read/written whereby the AP reads data in the first region without using an external Interface Unit (IF),
a second region which the CP accesses and from/to which data of the CP is read/written, and a third region which the AP accesses and from/to which data of the AP is read/written.

2. The circuit of claim 1, wherein the data of the CP comprises at least one of data which has been processed by the CP, and data which will be transmitted by the CP.

3. The circuit of claim 1, wherein the first region comprises a downlink data region from/to which downlink data among the data of the at least one of the AP and the CP is read/written, and an uplink data region from/to which uplink data among the data of the at least one of the AP and the CP is read/written.

4. The circuit of claim 1, wherein the first region comprises an AP data region from/to which the data of the AP is read/written, and a CP data region from/to which the data of the CP is read/written.

5. The circuit of claim 1, wherein the first region comprises a downlink data region from/to which downlink data among the data of the CP is read/written, and an uplink data region from/to which uplink data among the data of the CP is read/written.

6. The circuit of claim 1, wherein the CP is configured to transmit information on a location of data stored in the first region, and the AP is configured to read the data from the first region based on the information and notify the CP of completion.

7. A circuit for processing data, the circuit comprising:
an Application Processor (AP);
a Communication Processor (CP); and
a storage unit comprising:
a first region which the CP operatively controls, and the AP and the CP access and from/to which data of at least one of the AP and the CP is read/written whereby the AP reads data in the first region without using an external Interface Unit (IF),
a second region which the CP accesses and from/to which data of the CP is read/written,
a third region which the AP and the CP access and from/to which an Inter Processor Communication (IPC) message used for an IPC between the AP and the CP is read/written, and
a fourth region which the AP accesses and from/to which data of the AP is read/written.

8. The circuit of claim 7, wherein the data of the CP comprises at least one of data which has been processed by the CP, and data which will be transmitted by the CP.

9. The circuit of claim 7, wherein the first region comprises a downlink data region from/to which downlink data among the data of at least one of the AP and the CP is read/written, and an uplink data region from/to which uplink data among the data of the at least one of the AP and the CP is read/written.

10. The circuit of claim 7, wherein the first region comprises an AP data region from/to which the data of the AP is read/written, and a CP data region from/to which the data of the CP is read/written.

11. The circuit of claim 7, wherein the first region comprises a downlink data region from/to which downlink data among the data of the CP is read/written, and an uplink data region from/to which uplink data among the data of the CP is read/written.

12. The circuit of claim 7, wherein the third region comprises a region from/to which an IPC message transferred from the CP to the AP is read/written, and a region from/to which an IPC message transferred from the AP to the CP is read/written.

13. The circuit of claim 7, wherein the CP is configured to transmit information on a location of data stored in the first region, and the AP is configured to read the data from the first region based on the information and notify the CP of completion.

14. An apparatus for processing data, the apparatus comprising:
an Application Processor (AP);
a Communication Processor (CP); and
a storage unit comprising:
a first region which the CP operatively controls, and the AP and the CP access and from/to which data of at least one of the AP and the CP is read/written whereby the AP reads data in the first region without using an external Interface Unit (IF),
a second region which the CP accesses and from/to which data of the CP is read/written, and a third region which the AP accesses and from/to which data of the AP is read/written.

15. The apparatus of claim 14, wherein the data of the CP comprises at least one of data which has been processed by the CP, and data which will be transmitted by the CP.

16. The apparatus of claim 14, wherein the first region comprises a downlink data region from/to which downlink data among the data of the at least one of the AP and the CP is read/written, and an uplink data region from/to which uplink data among the data of the at least one of the AP and the CP is read/written.

17. The apparatus of claim 14, wherein the first region comprises an AP data region from/to which the data of the AP is read/written, and a CP data region from/to which the data of the CP is read/written.

18. The apparatus of claim 14, wherein the first region comprises a downlink data region from/to which downlink data among the data of the CP is read/written, and an uplink data region from/to which uplink data among the data of the CP is read/written.

19. The apparatus of claim 14, wherein the CP is configured to transmit information on a location of data stored in the first region, and the AP is configured to read the data from the first region based on the information and notify the CP of completion.

20. An apparatus for processing data, the apparatus comprising:
   an Application Processor (AP);
   a Communication Processor (CP); and
   a storage unit comprising:
   a first region which the CP operatively controls, and the AP and the CP access and from/to which data of at least one of the AP and the CP is read/written whereby the AP reads data in the first region without using an external Interface Unit (IF),
   a second region which the CP accesses and from/to which data of the CP is read/written, a third region which the AP and the CP access and from/to which an Inter Processor Communication (IPC) message used for an IPC between the AP and the CP is read/written, and
   a fourth region which the AP accesses and from/to which data of the AP is read/written.

21. The apparatus of claim 20, wherein the data of the CP comprises at least one of data which has been processed by the CP, and data which will be transmitted by the CP.

22. The apparatus of claim 20, wherein the first region comprises a downlink data region from/to which downlink data among the data of the at least one of the AP and the CP is read/written, and an uplink data region from/to which uplink data among the data of the at least one of the AP and the CP is read/written.

23. The apparatus of claim 20, wherein the first region comprises an AP data region from/to which the data of the AP is read/written, and a CP data region from/to which the data of the CP is read/written.

24. The apparatus of claim 20, wherein the first region comprises a downlink data region from/to which downlink data among the data of the CP is read/written, and an uplink data region from/to which uplink data among the data of the CP is read/written.

25. The apparatus of claim 20, wherein the third region comprises a region from/to which an IPC message transferred from the CP to the AP is read/written, and a region from/to which an IPC message transferred from the AP to the CP is read/written.

26. The apparatus of claim 20, wherein the CP is configured to transmit information on a location of data stored in the first region, and the AP is configured to read the data from the first region based on the information and notify the CP of completion.

27. An apparatus for processing data, the apparatus comprising:
   an Application Processor (AP);
   a Communication Processor (CP); and
   a storage unit that is shared by the AP and the CP and operatively controlled by the CP, which stores data of at least one of the AP and the CP whereby the AP reads data in the first region without using an external Interface Unit (IF), and that comprises two regions, one of which is configured to store only CP related data, and another of which is configured to store only AP related data.

28. The apparatus of claim 27, wherein the CP is configured to transmit information on a location of data stored in a region shared by the AP and the CP, and the AP is configured to read the data from the region shared by the AP and the CP based on the information and notify the CP of completion.

* * * * *